US010492641B2

(12) United States Patent
Kestner et al.

(10) Patent No.: US 10,492,641 B2
(45) Date of Patent: *Dec. 3, 2019

(54) MULTI-ZONE FOOD HOLDING BIN

(71) Applicant: PRINCE CASTLE LLC, Carol Stream, IL (US)

(72) Inventors: Kyle Thomas Kestner, Schaumburg, IL (US); Christopher B. Lyons, Jr., LaGrange, IL (US); Charles B. Hartfelder, Hanover Park, IL (US); Zachary N. McCoy, South Elgin, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,255

(22) Filed: May 21, 2018

(65) Prior Publication Data

US 2018/0270906 A1 Sep. 20, 2018

Related U.S. Application Data

(63) Continuation of application No. 15/133,220, filed on Apr. 19, 2016, now Pat. No. 9,980,322.

(51) Int. Cl.
*A47J 36/24* (2006.01)
*A47J 39/02* (2006.01)
*A47J 39/00* (2006.01)
*F24C 15/18* (2006.01)

(52) U.S. Cl.
CPC ....... *A47J 36/2483* (2013.01); *A47J 36/2488* (2013.01); *A47J 39/006* (2013.01); *F24C 15/18* (2013.01)

(58) Field of Classification Search
None
See application file for complete search history.

(56) References Cited

U.S. PATENT DOCUMENTS

| D63,818 S | 1/1924 | Curtiss |
| 2,386,919 A | 10/1945 | Tobey |
| 2,900,806 A | 8/1959 | Wurtz et al. |
| 2,934,913 A | 5/1960 | Haines et al. |
| 3,042,384 A | 7/1962 | Bauman |
| 3,275,393 A | 9/1966 | Stentz et al. |
| 3,301,618 A | 1/1967 | Feldser et al. |
| 3,308,633 A | 3/1967 | Kritzer, Jr. |
| 3,393,630 A | 7/1968 | Pickens |
| 3,414,709 A | 12/1968 | Tricault |

(Continued)

FOREIGN PATENT DOCUMENTS

| JP | 8000414 | 1/1996 |
| JP | 10079088 | 3/1998 |

(Continued)

OTHER PUBLICATIONS

"Modular Holding Cabinets", Product Catalog, Carter-Hoffmann, Mundelein, Illinois (Jan. 2014).

(Continued)

*Primary Examiner* — Joseph M Pelham
(74) *Attorney, Agent, or Firm* — Marshall, Gerstein & Borun LLP

(57) ABSTRACT

A multi-zone food holding bin has a continuous food supporting surface with multiple food holding zones. Each food holding zone is independently controllable so that different food temperatures may be maintained in adjacent food holding zones.

34 Claims, 6 Drawing Sheets

(56) References Cited

U.S. PATENT DOCUMENTS

| | | | |
|---|---|---|---|
| 3,696,720 | A | 10/1972 | Vinson |
| 3,950,632 | A | 4/1976 | Rivelli |
| 3,979,056 | A | 9/1976 | Barnes |
| D243,362 | S | 2/1977 | Shumrak et al. |
| 4,036,995 | A | 7/1977 | Koether et al. |
| 4,077,690 | A | 3/1978 | Koether |
| 4,093,041 | A | 6/1978 | Davis et al. |
| 4,278,872 | A | 7/1981 | Koether et al. |
| 4,306,616 | A | 12/1981 | Woods, Jr. et al. |
| 4,355,521 | A | 10/1982 | Tsai |
| 4,388,689 | A | 6/1983 | Hayman et al. |
| 4,530,067 | A | 7/1985 | Dorr |
| 4,569,421 | A | 2/1986 | Sandstedt |
| 4,610,238 | A | 9/1986 | Veth |
| 4,633,230 | A | 12/1986 | Tam |
| 4,644,931 | A | 2/1987 | Veth |
| 4,688,475 | A | 8/1987 | Witt et al. |
| 4,740,888 | A | 4/1988 | Ceste, Sr. et al. |
| 4,742,455 | A | 5/1988 | Schreyer |
| 4,782,445 | A | 11/1988 | Pasquini |
| 4,812,625 | A | 3/1989 | Ceste, Sr. |
| 4,812,963 | A | 3/1989 | Albrecht et al. |
| 4,864,498 | A | 9/1989 | Pasquini et al. |
| 4,911,068 | A | 3/1990 | Koether et al. |
| 4,922,435 | A | 5/1990 | Cahlander et al. |
| 5,003,472 | A | 3/1991 | Perrill et al. |
| 5,069,273 | A | 12/1991 | O'Hearne |
| 5,093,556 | A * | 3/1992 | Oelfke .................. A47J 39/006 219/386 |
| 5,128,862 | A | 7/1992 | Mueller |
| 5,132,914 | A | 7/1992 | Cahlander et al. |
| 5,172,328 | A | 12/1992 | Cahlander et al. |
| 5,188,020 | A | 2/1993 | Buchnag |
| 5,216,918 | A | 6/1993 | Landis et al. |
| 5,218,527 | A | 6/1993 | Ishikawa et al. |
| 5,247,807 | A | 9/1993 | Jarman et al. |
| 5,253,564 | A | 10/1993 | Rosenbrock et al. |
| D341,054 | S | 11/1993 | Maputol |
| 5,357,426 | A | 10/1994 | Morita et al. |
| D364,530 | S | 11/1995 | Robards, Jr. et al. |
| 5,485,780 | A | 1/1996 | Koether et al. |
| D369,269 | S | 4/1996 | Labadia Del Fresno |
| 5,504,589 | A | 4/1996 | Montague et al. |
| 5,510,979 | A | 4/1996 | Moderi et al. |
| 5,539,671 | A | 7/1996 | Albrecht et al. |
| 5,553,312 | A | 9/1996 | Gattey et al. |
| 5,579,952 | A | 12/1996 | Fiedler et al. |
| 5,590,586 | A | 1/1997 | Ulfig et al. |
| 5,594,222 | A | 1/1997 | Caldwell |
| 5,616,269 | A | 4/1997 | Fowler et al. |
| 5,653,906 | A | 8/1997 | Fowler et al. |
| 5,724,886 | A | 3/1998 | Ewald et al. |
| 5,772,072 | A | 6/1998 | Prescott et al. |
| 5,783,803 | A | 7/1998 | Robards, Jr. |
| 5,812,393 | A | 9/1998 | Drucker |
| 5,900,173 | A | 5/1999 | Robards, Jr. |
| 5,921,096 | A | 7/1999 | Warren |
| 5,931,083 | A | 8/1999 | Stanger et al. |
| 5,939,974 | A | 8/1999 | Heagle et al. |
| 5,944,324 | A | 8/1999 | Schultheis et al. |
| 5,947,012 | A | 9/1999 | Ewald et al. |
| 6,000,622 | A | 12/1999 | Tonner et al. |
| 6,006,996 | A | 12/1999 | Bhatnagar |
| 6,011,243 | A | 1/2000 | Arnold et al. |
| 6,026,372 | A | 2/2000 | Savage |
| 6,031,208 | A | 2/2000 | Witt et al. |
| 6,052,667 | A | 4/2000 | Walker et al. |
| D427,008 | S | 6/2000 | Wasner |
| D427,479 | S | 7/2000 | Wasner |
| 6,088,681 | A | 7/2000 | Coleman et al. |
| 6,114,659 | A | 9/2000 | Finck et al. |
| 6,116,154 | A | 9/2000 | Vaseloff |
| 6,119,587 | A | 9/2000 | Ewald et al. |
| D434,265 | S | 11/2000 | Tatlow |
| 6,153,244 | A | 11/2000 | Stanger et al. |
| 6,158,885 | A | 12/2000 | Landis |
| 6,175,099 | B1 | 1/2001 | Shei et al. |
| 6,200,944 | B1 | 3/2001 | Dovey et al. |
| 6,209,447 | B1 | 4/2001 | Ewald et al. |
| 6,257,010 | B1 | 7/2001 | Shei et al. |
| 6,261,621 | B1 | 7/2001 | Stanger et al. |
| 6,262,394 | B1 | 7/2001 | Shei et al. |
| 6,412,403 | B1 | 7/2002 | Veltrop |
| 6,434,961 | B2 | 8/2002 | Richmond et al. |
| 6,502,411 | B2 | 1/2003 | Okamoto |
| 6,541,739 | B2 | 4/2003 | Shei et al. |
| D480,260 | S | 10/2003 | Domi et al. |
| 6,637,322 | B2 | 10/2003 | Veltrop |
| 6,658,994 | B1 | 12/2003 | McMillan |
| 6,825,447 | B2 | 11/2004 | Kim et al. |
| 6,834,276 | B1 | 12/2004 | Jensen et al. |
| 6,878,391 | B2 | 4/2005 | Veltrop |
| 6,884,451 | B2 | 4/2005 | Veltrop |
| 7,028,498 | B2 | 4/2006 | Monroe et al. |
| 7,105,779 | B2 | 9/2006 | Shei |
| 7,132,926 | B2 | 11/2006 | Vaseloff et al. |
| 7,227,102 | B2 | 6/2007 | Shei |
| 7,235,762 | B2 | 6/2007 | Gagas et al. |
| 7,238,654 | B2 | 7/2007 | Hodge et al. |
| 7,258,064 | B2 | 8/2007 | Vaseloff et al. |
| 7,279,659 | B2 | 10/2007 | Gagas et al. |
| 7,328,654 | B2 | 2/2008 | Shei |
| RE40,151 | E | 3/2008 | Shei et al. |
| RE40,290 | E | 5/2008 | Shei et al. |
| 7,376,485 | B2 | 5/2008 | Salerno |
| D570,715 | S | 6/2008 | Di Federico |
| 7,381,927 | B1 | 6/2008 | Agnello |
| 7,385,160 | B2 | 6/2008 | Jones |
| 7,446,282 | B2 | 11/2008 | Shei et al. |
| 7,628,107 | B2 | 12/2009 | Vaseloff et al. |
| 7,762,636 | B2 | 7/2010 | Veeser et al. |
| 7,858,906 | B2 | 12/2010 | Veltrop et al. |
| 7,905,173 | B2 | 3/2011 | Sus et al. |
| 7,971,523 | B2 | 7/2011 | Hartfelder et al. |
| 8,091,472 | B2 | 1/2012 | Maciejewski et al. |
| 8,096,231 | B2 | 1/2012 | Veltrop et al. |
| 8,134,101 | B2 | 3/2012 | Majchrzak |
| 8,247,745 | B2 | 8/2012 | Chung et al. |
| 8,404,292 | B2 | 3/2013 | Veltrop et al. |
| 8,522,675 | B2 | 9/2013 | Veltrop |
| 8,558,142 | B2 | 10/2013 | Theodos et al. |
| 8,667,807 | B2 | 3/2014 | Veltrop |
| D704,982 | S | 5/2014 | Gates |
| D716,095 | S | 10/2014 | Veltrop et al. |
| 8,997,636 | B2 | 4/2015 | Kirby et al. |
| 9,003,820 | B2 | 4/2015 | Veltrop |
| 9,068,768 | B2 | 6/2015 | Veltrop |
| 9,140,484 | B2 | 9/2015 | Veltrop |
| 9,140,485 | B2 | 9/2015 | Veltrop |
| 2001/0007322 | A1 | 7/2001 | Shei et al. |
| 2001/0053963 | A1 | 12/2001 | Kim et al. |
| 2003/0118706 | A1 | 6/2003 | Veltrop |
| 2004/0000162 | A1 | 1/2004 | Song |
| 2004/0016242 | A1 | 1/2004 | Song et al. |
| 2004/0019534 | A1 | 1/2004 | Callahan et al. |
| 2004/0020915 | A1 | 2/2004 | Shei |
| 2004/0060320 | A1 | 4/2004 | Roh et al. |
| 2005/0211696 | A1 | 9/2005 | Adamski |
| 2005/0236947 | A1 | 10/2005 | LeClear et al. |
| 2006/0150662 | A1 | 7/2006 | Lee et al. |
| 2006/0185527 | A1 | 8/2006 | Shei |
| 2007/0017245 | A1 | 1/2007 | Song et al. |
| 2007/0144202 | A1 | 6/2007 | Theodos et al. |
| 2007/0251397 | A1 | 11/2007 | Dorsten et al. |
| 2008/0023462 | A1 | 1/2008 | Shei et al. |
| 2008/0213449 | A1 | 9/2008 | Wisner et al. |
| 2008/0302778 | A1 | 12/2008 | Veltrop et al. |
| 2009/0045185 | A1 | 2/2009 | Schroeder et al. |
| 2009/0126580 | A1 | 5/2009 | Hartfelder et al. |
| 2009/0199723 | A1 | 8/2009 | Veltrop et al. |
| 2009/0199725 | A1 | 8/2009 | Veltrop et al. |
| 2009/0266244 | A1 | 10/2009 | Maciejewski et al. |
| 2009/0309027 | A1 | 12/2009 | Von Striver |
| 2010/0205992 | A1 | 8/2010 | Morris |

(56) References Cited

U.S. PATENT DOCUMENTS

| | | | |
|---|---|---|---|
| 2010/0288748 A1* | 11/2010 | Fortmann | F24C 15/166 219/385 |
| 2011/0030565 A1 | 2/2011 | Shei | |
| 2011/0114618 A1* | 5/2011 | Chung | A47J 39/006 219/201 |
| 2011/0114624 A1* | 5/2011 | Chung | A47J 39/006 219/385 |
| 2011/0252813 A1 | 10/2011 | Veltrop | |
| 2011/0253698 A1 | 10/2011 | Theodos et al. | |
| 2011/0253703 A1 | 10/2011 | Theodos et al. | |
| 2011/0278278 A1 | 11/2011 | Emerich et al. | |
| 2011/0283895 A1 | 11/2011 | Veltrop | |
| 2012/0079699 A1 | 4/2012 | Veltrop et al. | |
| 2012/0261426 A1 | 10/2012 | Tomczyk et al. | |
| 2012/0285942 A1 | 11/2012 | Godecker et al. | |
| 2013/0175253 A1 | 7/2013 | Shei et al. | |
| 2014/0010937 A1 | 1/2014 | Stanger | |
| 2014/0057031 A1 | 2/2014 | Ewald et al. | |
| 2014/0083309 A1 | 3/2014 | Reese et al. | |
| 2014/0130684 A1 | 5/2014 | Reese et al. | |
| 2014/0150461 A1 | 6/2014 | Veltrop | |
| 2014/0165644 A1 | 6/2014 | Veltrop | |
| 2014/0174101 A1 | 6/2014 | Veltrop | |
| 2014/0197177 A1 | 7/2014 | Veltrop et al. | |
| 2014/0246966 A1 | 9/2014 | Nevarez | |
| 2014/0263269 A1 | 9/2014 | Veltrop et al. | |
| 2015/0201749 A1 | 7/2015 | Turner et al. | |
| 2015/0201803 A1 | 7/2015 | Veltrop | |

FOREIGN PATENT DOCUMENTS

| | | |
|---|---|---|
| JP | 11342061 | 12/1999 |
| WO | WO-01/31533 A1 | 5/2001 |
| WO | WO-2005/034633 A1 | 4/2005 |

OTHER PUBLICATIONS

Betzold et al., U.S. Appl. No. 14/278,549, "Modular Food Holding Cabinet Having Individually Configurable Food Holding Units", filed May 15, 2014.

Final Office Action issued for U.S. Appl. No. 12/782,843 dated Dec. 31, 2012, USPTO.

Final Office Action issued for U.S. Appl. No. 13/567,821 dated Jun. 6, 2013, USPTO.

Frymaster HCP Installation and Operation Manual, Dec. 2006, pp. 1-1 to 10-4, title page and table of publisher, Enodis, Frymaster LLC, Shreveport, LA.

Non-Final Office Action issued for U.S. Appl. No. 12/782,843 dated Jun. 19, 2013, USPTO.

Non-Final Office Action issued for U.S. Appl. No. 12/782,843 dated Aug. 21, 2012, USPTO.

Non-Final Office Action issued for U.S. Appl. No. 13/567,821 dated Feb. 8, 2013, USPTO.

Prince Castle LLC, Holding Bins (www.princecastle.com <http://www.princecastle.com>).

Prince Castle LLC, Holding Panels (www.princecastle.com <http://www.princecastle.com>).

Reider, How to Say What Stuff Looks Like, Ontario, Canada: Marcus Books, p. 62 (1995).

Thermodyne Food Products, Inc., Counter Top Holding Oven Model 300 NDNL specification.

Veltrop et al., Design U.S. Appl. No. 29/450,074, "Food Warmer", filed Mar. 15, 2013.

Veltrop et al., Design U.S. Appl. No. 29/494,683, "Food Warmer", filed Jun. 23, 2014.

Prince Castle LLC, Holding Bin DHB3PT-33DD, Jun. 2015.

Prince Castle LLC, Original Instructions Operation Manual for Holding Ben DHB3PT-33DD, DHB3SS-33DD, available prior to Apr. 19, 2016.

* cited by examiner

MULTI-ZONE FOOD HOLDING BIN

RELATED APPLICATIONS

This application is a continuation of U.S. patent application Ser. No. 15/133,220, filed Apr. 19, 2016, the entirety of which is hereby incorporated by reference herein.

BACKGROUND

Often the success of a restaurant depends, at least in part, on how quickly customers can be served with ordered food items and also on the quality of the food items when served. If the rate of food preparation equals the rate at which the food is ordered and sold, a restaurant can theoretically have freshly-prepared foods ready to serve for customers as they arrive. Since it is not always possible to match food production with customer ordering rates, and since certain fast food restaurant customers expect to receive their ordered food items quickly, many fast food restaurants prepare various food items in advance and keep them ready for sale until a customer arrives and purchases a pre-cooked food item.

To facilitate the food holding process, holding bins or holding ovens are often used to keep the food warm. Known holding bins can allow a cooked food item to be inserted from one side and taken from the opposite side whereby food preparers add food to the holding bin on one side and food servers on the opposite take food from the holding bin. Food holding bins in which the cooked food item is inserted and removed from the same side are also known. The food items in the holding bins are kept warm by heating elements. However, food holding time in known holding bins or ovens is somewhat limited, generally less than 15 or 20 minutes before the food item must be discarded. As a result, restaurants can only keep a limited amount of pre-cooked food items on hand and often a significant amount of the pre-cooked food items must be discarded before they are sold, resulting in additional costs.

DETAILED DESCRIPTION

Figure 1:
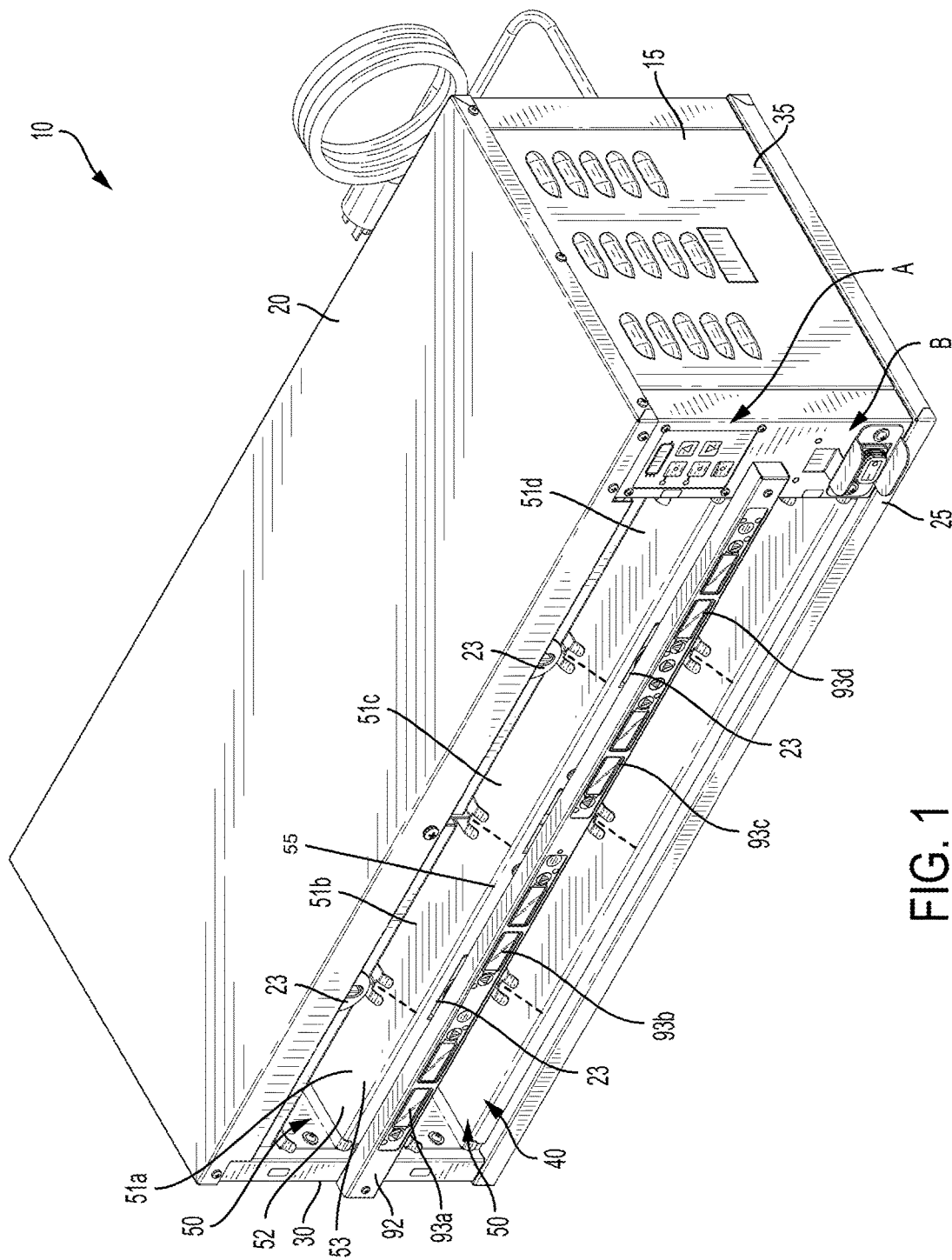
FIG. 1 is a perspective view of a multi-zone food holding bin.
Figure 2:
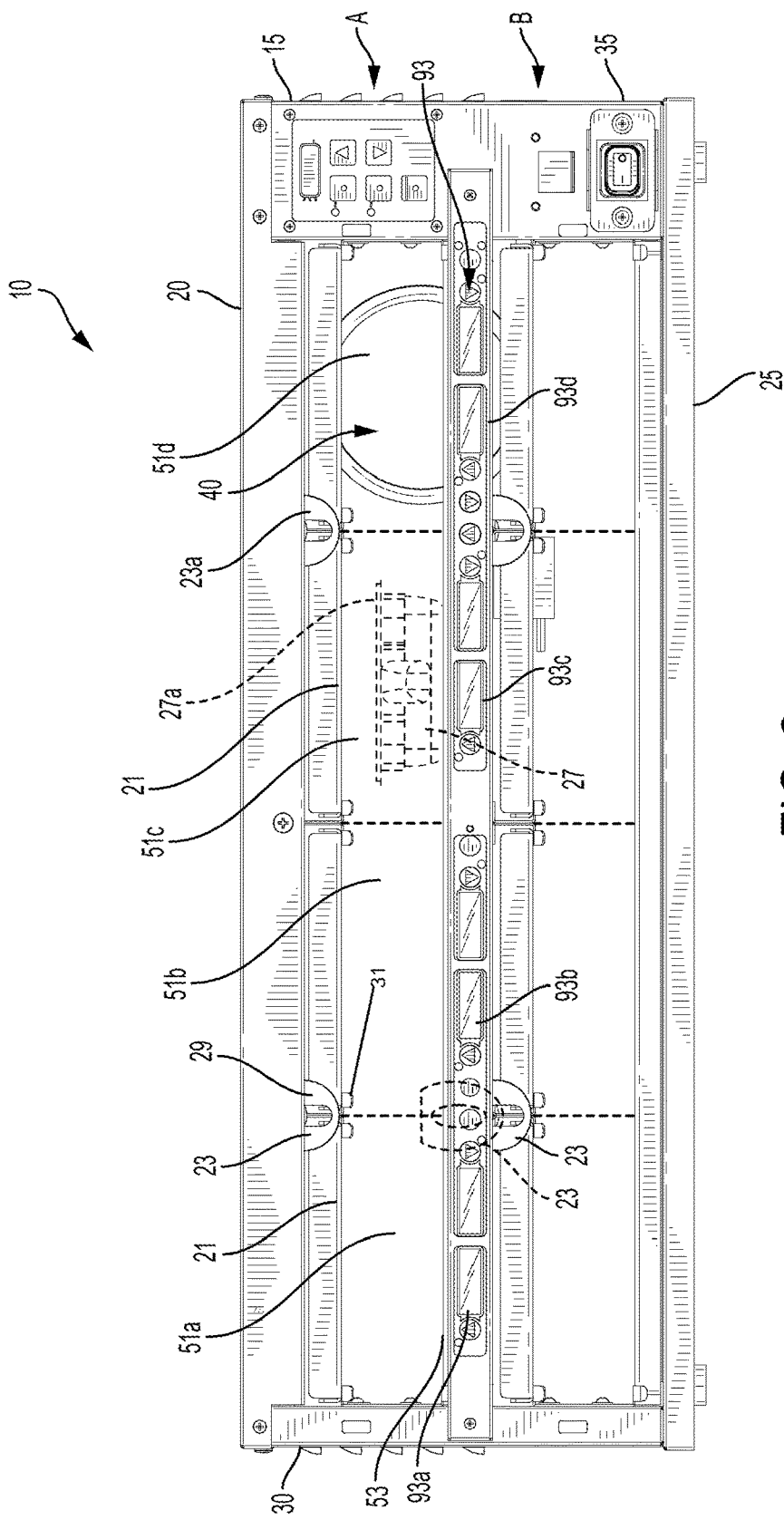
FIG. 2 is a front elevational view of the multi-zone food holding bin of FIG. 1.
Figure 3:
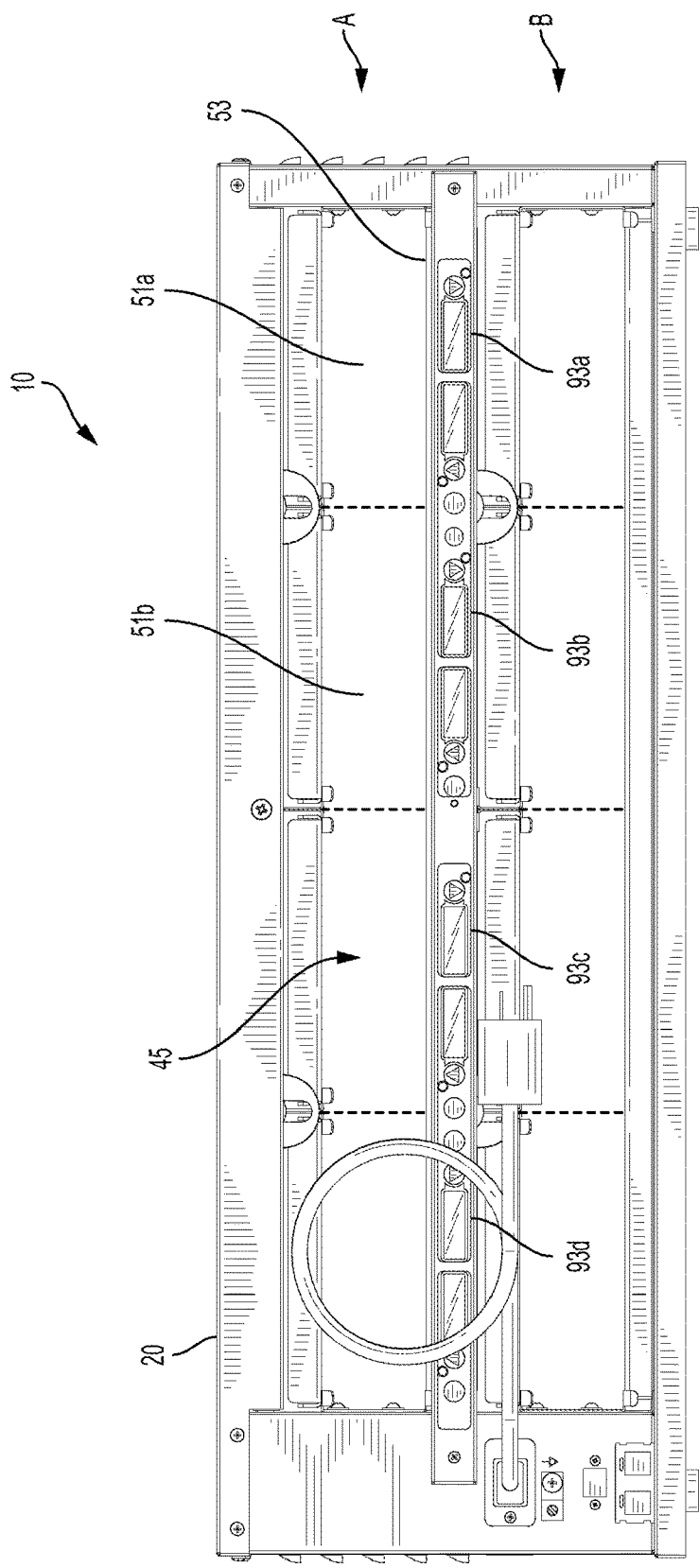
FIG. 3 is a rear elevational view of the multi-zone food holding bin of FIG. 1.

Turning now to FIGS. 1-3, a multi-zone food holding bin 10 includes two separate food holding compartments 50. Additional food holding compartments 50 may also be included as explained in further detail below. Each separate food holding compartment 50 includes two or more separate food holding zones, for example, a first food holding zone 51a and a second food holding zone 51b. As illustrated in FIGS. 1-3, the multi-zone food holding bin 10 also includes a third food holding zone 51c and a fourth food holding zone 51d. The food holding zones 51a, 51b, 51c, and 51d are illustrated as being separated from one another by a dashed line in FIGS. 1-3. The dashed lines are for illustration only. The food holding zone need not have their boundaries identified with any sort of line or other indicia in food holding compartment 50. Each food holding zone 51a, 51b, 51c, and 51d can be configured to maintain a different food holding temperature, advantageously allowing the operator to hold different food products with different heating requirements in the same food holding compartment 50, thereby permitting increased energy efficiencies to be realized and potentially reducing the space requirements for holding different foods. For example, a first food product such as french toast can be held at a first temperature in the first food holding zone 51a and a second food product such as eggs can be held at a second temperature in the second food holding zone 51b, the second temperature capable of being independently set to be different from the first temperature. Similarly, a third food product such as sausage patties can be held at a third temperature in the third food holding zone 51c, the third temperature capable of being independently set to be the same or different from the first and second temperatures. And a fourth food product such as hash browns can be held at a fourth temperature in the fourth food holding zone 51d, the fourth temperature capable of being independently set to be the same or different from the first, second, and third temperatures. This can be particularly useful for restaurants during lower demand times and also for smaller restaurants and retail operations.

In one embodiment of the cabinet 10, all of the compartments 50 are heated. In another embodiment, some compartments 50 may be refrigerated while other compartments 50 are heated. In yet another embodiment, one or more compartments 50 can be selectively heated or refrigerated.

The cabinet 10 includes a chassis 15. As illustrated, the chassis 15 includes a top panel 20, a bottom panel 25, left-side panel 30, right side panel 35, an open front face 40 and an open rear face 45. When the rear face 45 is open and uncovered, food items can be inserted by a first operator responsible for initial food preparation and passed through to a second operator responsible for final food preparation, for example, packaging and customization of a food product for serving to the ultimate customer. In another embodiment, the rear face 45 may be "closed" and provided by a rear panel such that access into the cabinet 10 is only provided by the open front face 40. The panels may be insulated to reduce heat transfer between the interior of the cabinet 10 and the atmosphere surrounding the cabinet 10.

The cabinet 10 illustrated in FIG. 1 is sized, shaped and arranged to have two compartments 50, however, the cabinet can have any number of compartments 50, including a single compartment 50. For clarity, the two compartments 50 depicted in FIGS. 1-3 are denominated using the letters A and B. The "A" compartment is the top or uppermost compartment 50 and the "B" compartment is the bottom or lower-most compartment 50.

In the embodiment illustrated in FIG. 1, the top or "A" compartment is defined by the left and right sidewalls 30 and 35, the chassis top panel 20 and a first or upper-most shelf 52. Compartment "B" is defined by the two sidewalls 30 and 35, the first or upper-most shelf 52, and the chassis bottom panel 25. In cabinet embodiments having only one compartment 50, the single compartment is defined by opposing, left and right sidewalls 30 and 35, a chassis top panel 20 and a chassis bottom panel 25. For brevity, cabinet construction and operation is described with regard to a cabinet 10 having two compartments 50 in FIGS. 1-3. However, other embodiments may have more than two compartments 50 or less than two compartments 50. For example, the embodiments illustrated in FIGS. 4A, 4B, 5, and 6 have four compartments 50. Again, other configurations are also possible.

The shelf 52, which partially defines the compartments 50, is planar or at least substantially planar and supported in the chassis 15 at opposing side ends by the two chassis side walls 30 and 35. The shelf 52 includes a planar and continuous top surface, which forms a planar and continuous bottom surface 53 of the upper compartment 50. The planar and continuous bottom surface 53 of the upper compartment 50 is configured to support food items (as used herein, the term "food item" includes but is not limited to containers or trays containing food products such as cooked protein patties, fried foods, and the like). In the illustrated embodiment, food items can be placed onto the planar and continuous bottom surface 53 and removed from the planar and continuous bottom surface 53 through the open front face 40 or through the open rear face 45. Because the bottom surface 53 is planar and continuous and substantially free of any dividing walls or other structure between the holding zones 51a, 51b, 51c, and 51d, cleaning of the bottom surface 53 can be easily accomplished.

A face plate or bezel 92 is generally attached to the front of the chassis 15. For example, the bezel can be attached to the sidewalls 30 and 35 of the chassis 15 so as to be disposed underneath a top surface of the shelf 52. In cabinet embodiments having only one compartment 50, the bezel 92 may be attached to either of the chassis top or bottom panels 20, 25 of the cabinet 10. In the illustrated embodiment of FIGS. 1-3, the bezel 92 is set forward from the shelf 52 by a space 55. The space 52 forms a slot in which one or more latches 23 translate and/or rotate to release lids held in lid holding ledges 31 as will be discussed further below.

The bezels 92 include information displays and controls, which are collectively identified by reference numeral 93. Although the chassis 15 can include panels concealing the heat generating devices located within a shelf, the bezel 92 also can conceal heating elements, which are located within the shelf 52, such that a separate panel is not present.

Each food holding zone 51a, 51b, 51c, 51d may include a dedicated display and control 93a, 93b, 93c, 93d, respectively. In the embodiment illustrated in FIGS. 1-3, the display and control 93a, 93b, 93c, and 93d displays the temperature setpoint of a respective food holding zone 51a, 51b, 51c, 51d. Moreover, each display and control 93a, 93b, 93c, 93d controls heating elements that maintain the temperature setpoint of the respective food holding zones 51a, 51b, 51c, 51d. The displays and controls 93a, 93b, 93c, 93d may be grouped together (i.e., arranged horizontally beneath the respective food holding zone 51a, 51b, 51c, 51d) in the bezel 92 for a corresponding compartment 50. In the embodiment illustrated in FIGS. 1-3, a single bezel 92 is used to provide the display and control elements for two vertically adjacent compartments 50, but of course discrete bezels can also be used. The displays and controls 93a, 93b provide a user graphical interface to one or more controllers (not shown) for the cabinet.

Each food holding zone 51a, 51b, 51c, 51d may be sized to receive a food holding tray 27 and lid 21 (see FIG. 2 where the tray 27 is illustrated in broken lines). In order to conveniently store the lid 21, each food holding zone 51a, 51b, 51c, 51d may also include a dedicated lid holding shelf 31 that is sized to receive and store the lid 21 when the lid 21 is desired for use in combination with a food holding tray 27, such as when protein patties are contained within the tray 27. Generally, a top surface 27a of a food holding tray 27, when received in the lid holding shelf 31, is substantially flush with a top surface of the lid holding shelf 31 such that when the tray 27 is disposed in the food holding zone 51c, the tray 27 can be in contact with and engaged by the lid 21 in the lid holding shelf 31 so as to retain moisture within the tray 27-lid 21 assembly. In some embodiments, the lid holding shelf 31 may be provided by formed sheet metal. In other embodiments, the lid holding shelf 31 may be provided by a wire form. Other structures are also possible.

Adjacent to each lid holding shelf 31 is one or more latches 23 having an open center portion. In the illustrated embodiment, the latches 23 have a round or curved body 29 that is rotatable and/or translatable (because of the open center) about a retaining element such as a pin or screw (not shown). In other embodiments, the latches 23 may have straight or angled outer surfaces that form other shapes, such as a square, a pentagon, a hexagon, or any other polygonal shape. The latches 23 may be disposed adjacent an opening into the food holding compartment 50 above the lid holding shelf 31. In one example, the latches 23 may be captured on a cylindrical retaining element between the chassis 15 and a top of the food holding compartment 50 above the lid holding shelf 31. In other embodiments, one or more washers (not shown), such as metal, nylon, or plastic washers, may be disposed on the cylindrical retaining element to space the latches 23 apart from the bezel 92 and the shelf 52 to prevent metal galling and/or to reduce friction between the latches 23 and the bezel 92 or shelf 52 to ease actuation of the latches 23.

The round body 29 may be oriented substantially parallel to a front face of the chassis 15 or the bezel 92 in a locked or default position, as illustrated by reference numeral 23a, which prevents inadvertent removal of a lid 21 from the lid holding shelf 31 when a tray 27 is withdrawn. The latch 23 is in its default or locked position simply because of gravity, thus re-positioning the latch to an unlocked state advantageously requires simply overcoming the weight of the latch 23 by translational and/or rotational movement. The round body 29 may be rotated and/or translated upwards relative to the bezel 92 or lid holding shelf 31 from the locked or default position to an unlocked position, as illustrated by the dotted lines referencing latch 23 between food holding zone 51a and food holding zone 51b in FIG. 1; this rotational and/or translational movement of the latch 23 about the retaining element allows facile insertion or removal of a lid 21 to/from the lid holding shelf 31. The round body 29 may be mounted on a retaining element such as a pin (not shown), which retains the round body 29 and allows the round body 29 to translate along the open center portion and/or to at least partially rotate about the pin when the round body 29 translates. The lid holding shelf 31 also allows the food holding compartment 50 to have the planar and continuous bottom surface 52 by storing the lids 27a in an elevated position, with the lid holding shelf 31 being suspended above the continuous bottom surface 52, typically by fixedly attaching a base of the shelf to a top surface of the food holding compartment 50 at one or more positions. Such continuous planar and continuous bottom surfaces 52 are much easier to clean than compartmentalized or divided heating chambers. Furthermore, the round body 29 of the latch 23 and the translation/rotation movement of the latch allow easy removal of the lids 27 from the lid holding tray 31 with one hand while positioning the latch 23 to the unlocked position with another hand.

From a purely functional standpoint, a preferred latch 23 might simply include a locking portion that is able to prevent inadvertent displacement of the lid 21 when the tray 27 is purposefully removed. Thus, a number of different configurations and shapes can be used for the latch 23. The latch 23 illustrated here with the round body 29, on the other hand, has an alternative, ornamental arrangement for the round body 29 in which the edges of the round body 29 include an arc-shaped, curved surface. This illustrated arrangement may add to the cost of manufacture, so the illustrated latch does not provide all of the possible economic advantages that might be derived from the invention. On the other hand, this arrangement is believed to be aesthetically pleasing and is likely to be recognized and relied upon by purchasers to identify the source of the food holding bin.

Figure 4A:
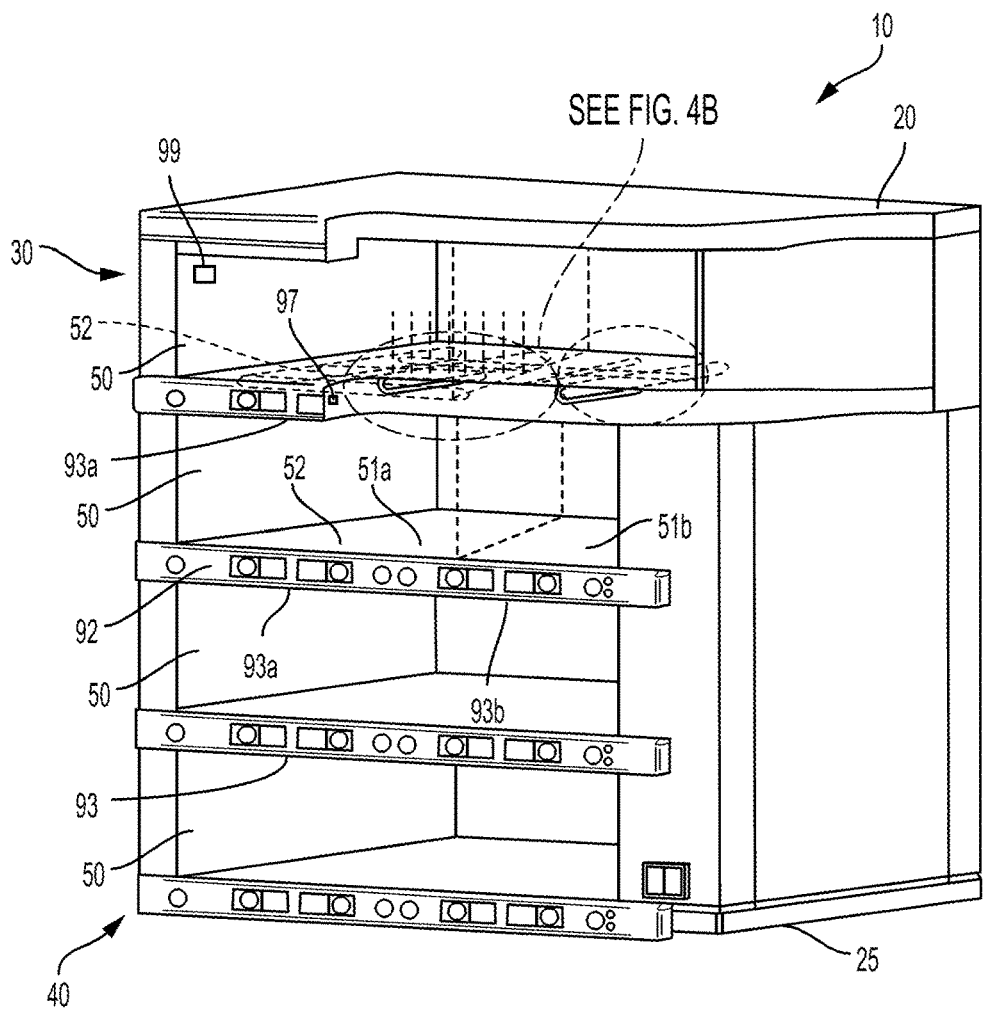
FIG. 4A is a partially cut-away top perspective view of an alternate embodiment of a multi-zone food holding bin.
Figure 4B:
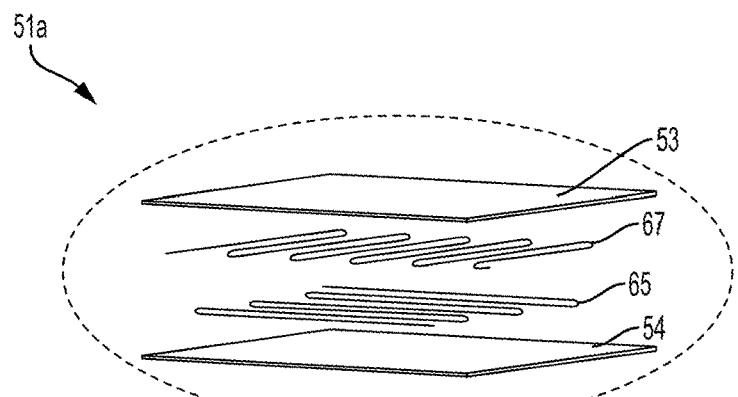
FIG. 4B is a close up of a shelf portion of the multi-zone food holding bin from circle 4B in FIG. 4A.
Figure 5:
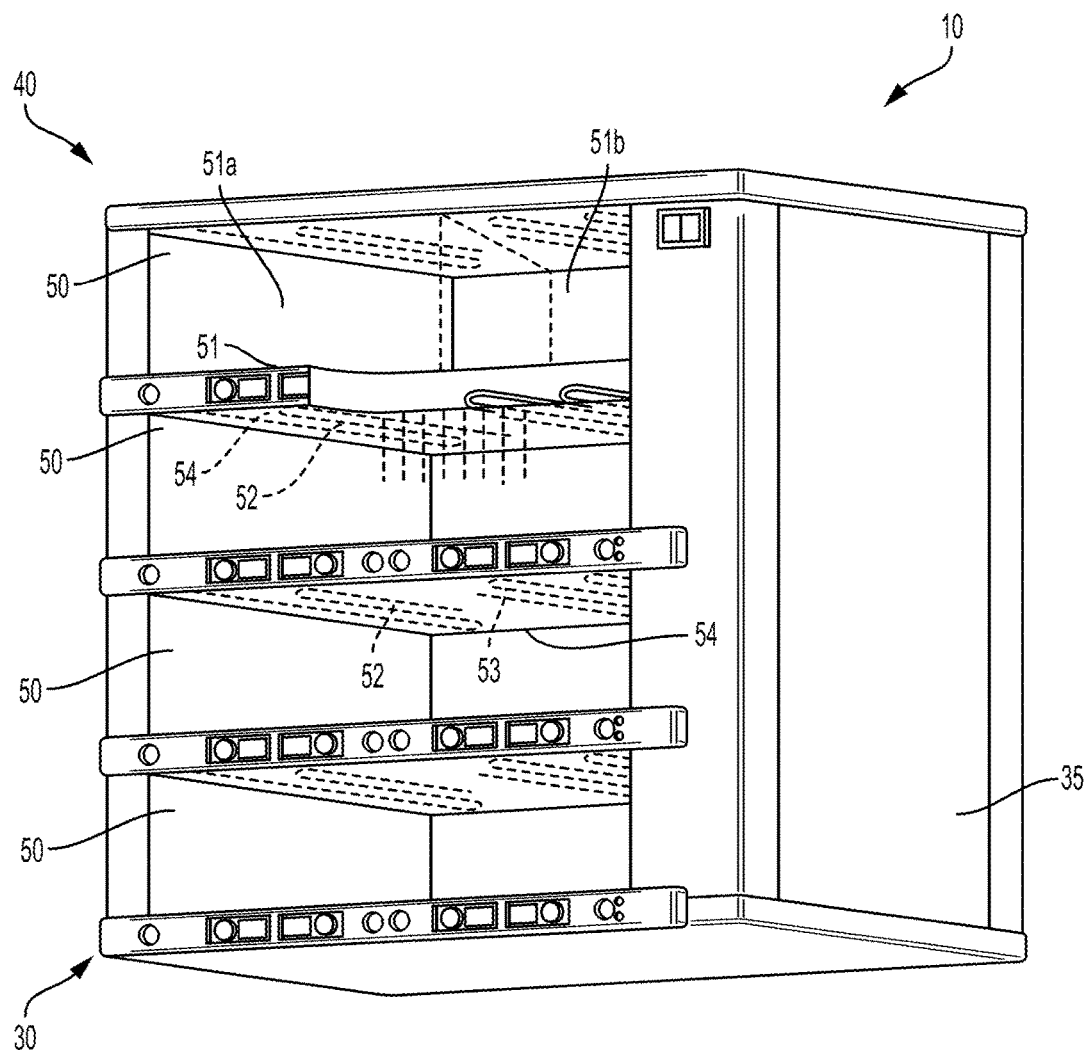
FIG. 5 is a partially cut-away bottom perspective view of the food holding bin of FIG. 4.

FIGS. 4A, 4B, and 5 are perspective views of an alternate embodiment of a multi-zone food holding bin 10, the embodiment of FIGS. 4A, 4B, and 5 including four separate food holding compartments 50. The embodiment of FIGS. 4A, 4B, and 5 is identical to the embodiment of FIGS. 1-3 with the exception that the embodiment of FIGS. 4A, 4B, and 5 includes four food holding compartments 50 instead of two. Thus, reference numbers identifying identical elements are the same in FIGS. 1-3 and in FIGS. 4A, 4B, and 5. Moreover, elements not illustrated in one of the embodiments are understood to be present in the other embodiment. For example, the embodiment illustrated in FIGS. 4A, 4B, and 5 includes cut-away views showing internal components that are not visible in FIGS. 1-3. Nevertheless, these internal components are understood to be present in the embodiment illustrated in FIGS. 1-3 as well.

Similar to the embodiment of FIGS. 1-3, each separate food holding compartment 50 in the food holding bin 10 of FIGS. 4A, 4B, and 5 includes at least two separate food holding zones, a first food holding zone 51a and a second food holding zone 51b. Each food holding zone 51a, 51b is configured to maintain a different temperature. Of course, it is not necessary for the food holding zones 51a, 51b to be operated at different temperatures in practice.

The cabinet 10 illustrated in FIG. 4A is sized, shaped and arranged to have four compartments 50, however, cabinets in accordance with the disclosure can have any number of compartments, including a single compartment.

In FIG. 4A, the first or top compartment is defined by the left and right sidewalls 30 and 35, the chassis top panel 20 and the first or upper-most shelf 52. The second compartment is defined by the two sidewalls 30 and 35, the shelf 52 for the first compartment and the second shelf 52. The third compartment is defined by the two sidewalls 30, 35, the second shelf 52 and the third shelf 52. The fourth compartment is defined by the two sidewalls 30 and 35, the third shelf and the chassis bottom 25.

The shelves 52, which partially define the compartments 50, are planar or at least substantially planar and supported in the chassis 15 at their opposing side ends by the two chassis side walls 30 and 35. Each shelf 52 forms a planar and continuous top surface, which defines a planar and continuous bottom surface 53 of the compartment 50. The planar and continuous bottom surface 53 of the compartment is configured to support food items (as mentioned above, the term "food item" includes but is not limited to containers or trays containing food products such as cooked protein patties, fried foods, and the like). Food items can be placed onto the planar bottom surface 53 and removed from the planar bottom surface 53 through the open front face 40 or through the open rear face 45.

Each food holding zone 51a, 51b may include a dedicated display and control 93a, 93b, respectively. Each display and control 93a, 93b displays the temperature setpoint of a respective food holding zone 51a, 51b. Moreover, each display and control 93a, 93b controls heating elements that maintain the temperature setpoint of the respective food holding zones 51a, 51b. The displays and controls 93a, 93b may be grouped together (i.e., arranged horizontally beneath the respective food holding zone 51a, 51b) in the bezel 92 for a corresponding compartment 50. In the embodiment illustrated in FIGS. 4A, 4B, and 5, a single bezel 92 is used to provide the display and control elements for a single compartment 50. The displays and controls 93a, 93b provide a graphical user interface to one or more controllers (not shown) for the cabinet.

Cabinet control and control of the food holding zone 51 temperature is effectuated in part by using one or more microcontrollers or microprocessors 97 in combination with temperature sensors 99. US 2011-0114624 A1 entitled "Food Holding Cabinet Power Supplies with Downloadable Software," the entirety of which is hereby incorporated by reference herein, discloses among other things, apparatuses and methods by which compartments of a food holding cabinet can be controlled using microprocessors having downloadable software. Compartment temperature control is preferably effectuated using a semiconductor temperature sensor, thermally coupled to each food holding zone 51 and electrically connected to a processor, such as those disclosed in US 2011-0114624 A1.

A semiconductor apparatus and method for measuring temperature of a plate or shelf in a food holding cabinet is disclosed in U.S. Pat. No. 8,247,745, which is entitled "Temperature Sensor for a Food Holding Cabinet" the entirety of which is hereby incorporated by reference herein.

The shelf 52 includes a lower heating element 67 for the first food holding zone 51a in a first or top food holding compartment 50, and an upper heating element 65 for a second food holding zone 51a in a second or lower food holding compartment 50, directly below the first food holding compartment 50. While the first heating element 67 is illustrated as providing heat to the upper first food holding zone 51a (from below) and the second heating element 65 is illustrated as providing heat to the lower first food holding zone 51a (from above), heating elements that are not shown include at least a heating element that provides heat to the upper first food holding zone 51a from above and another heating element that provides heat to the lower first food holding zone 51a from below. Additionally, the second food holding zones 51b, which are adjacent to the first food holding zones 51a, are heated in the same way as the first food holding zones, but with independent heating elements. The heating elements of the second food holding zone 51b are independently controllable from the heating elements of the first food holding zones 51a. Referring to the inset FIG. 4B, the shelf 52 includes an upper thermally conductive plate, which forms the continuous planar bottom surface 53 of the first (or upper) food holding compartment 50 and a lower thermally conductive plate, which forms a continuous planar upper surface 54 of the second (or lower) food holding compartment 50. The planar bottom surface 53 and the planar upper surface 54 are spaced apart from each other by a distance sufficient to accommodate the inclusion of at least two heating elements, which are illustrated in the figures as the separate first heating element 67 and the separate second heating element 65, respectively. Insulative materials may be provided between the first heating element 67 and the second heating element 65 to provide better thermal control over the food holding zones 51a, 51b. The first heating element 67 is a lower heating element for the upper food holding compartment 50 and the second heating element 65 is an upper heating element for the lower food holding compartment 50.

The continuous planar bottom surface 53 of the top food holding compartment 50 and the continuous planar upper surface 54 of the bottom food holding compartment are preferably made of aluminum, between about one-eighth and about one-quarter inch-thick. Alternate embodiments of the shelf 52 may use a thermally-conductive panel made of glass-ceramic or an ultra-low expansion glass for one or both of the lower surface 53 and the upper surface 54. Glass-ceramics and ultra-low expansion glass are considered herein to be "good" thermal conductors in that their conduction of heat energy is localized. Such materials also make excellent shelves for a heated, multi-zone food holding bin because they permit localized areas of a shelf to be heated to a first temperature, without having the entire shelf reach the same temperature.

The first heating element 67 is disposed between the planar bottom surface 53 and the planar upper surface 54 and the first heating element 67 is in thermal communication with the planar bottom surface 53. The first heating element 67 may be mechanically attached to the planar bottom surface 53 by a thermally-conductive adhesive, in one embodiment. The first heating element 67 may also be attached to the planar bottom surface 53 by brackets or clamps.

The second heating element 65 is disposed between the planar bottom surface 53 and the planar upper surface 54 and the second heating element 65 is in thermal communication with the planar upper surface 54. The second heating element 65 may be mechanically attached to the planar upper surface 54 by a thermally-conductive adhesive, in one embodiment. The second heating element 65 may also be attached to the planar upper surface 54 by brackets or clamps.

In the embodiment illustrated in FIGS. 4A, 4B, and 5, the first heating element 67 can be located above the second heating element 65 but in thermal communication with the planar bottom surface 53 such that when the temperature of the first heating element 67 rises, it provides heat energy into the planar bottom surface 53 in a region around the first heating element 67, and more specifically, within the first food holding zone 51a of the first or top food holding compartment 50. Thermally insulating the first heating element 67 from the planar upper surface 54 and thermally insulating the second heating element 65 from the planar bottom surface 53, enables the first heating element 67 to provide a first amount of heat energy into the planar bottom surface 53 (and thus into the first food holding zone 51a of the upper food holding compartment 50), while the second heating element 65 provides a second amount of heat energy into the planar upper surface 54 (and thus into the first food holding zone 51a of the lower food holding compartment 50). In this manner, each food holding zone 51a, 51b may be configured to have an independent and unique temperature profile from top to bottom of the food holding zone 51a, 51b. For example, one food holding zone 51a, 51b may have a temperature profile that generally decreases from top to bottom (i.e., the top of the food holding zone 51a, 51b is hotter than the bottom of the food holding zone 51a, 51b).

In some embodiments, the second heating element 65 may comprise a radiant heating source that projects radiant heat through the planar upper surface 54 and into the first food holding zone 51a of the lower food holding compartment 50. In other words, in one embodiment, the first heating element 67 provides heat energy into the first food holding zone 51a of the upper food holding compartment 50 through conduction, while the second heating element 65 provides heat energy into the first food holding zone 51a of the lower food holding compartment through radiation. Similarly, a radiant heating element may be provided at a top interior surface of the first or top food holding compartment 50 beneath the chassis top panel 20. In this manner, the top and bottom of a food product placed into the first food holding zone 51a may absorb different amounts of heat energy, customized depending on the type of food product. Thus, the heat profile in the first food holding zone 51a may be customized vertically as well as differentiated from the heat profile in the second food holding zone 51b. As a result, a single food holding compartment 50 (e.g., the upper compartment in FIGS. 4A and 5) may be customized to store different types of food products in the first food holding zone 51a and the second food holding zone 51b, each food holding zone 51a, 51b having a different temperature profile. As a result, the disclosed food holding bin 10 is flexible in that it can keep multiple different types of food products at their ideal holding temperatures in a single food holding compartment, thus increasing efficiency and adaptability to different food demands.

Because of this flexibility, it has been found that a food holding bin constructed in accordance with the disclosure can extend the palatability time of a food item by a factor of two or more.

Figure 6:
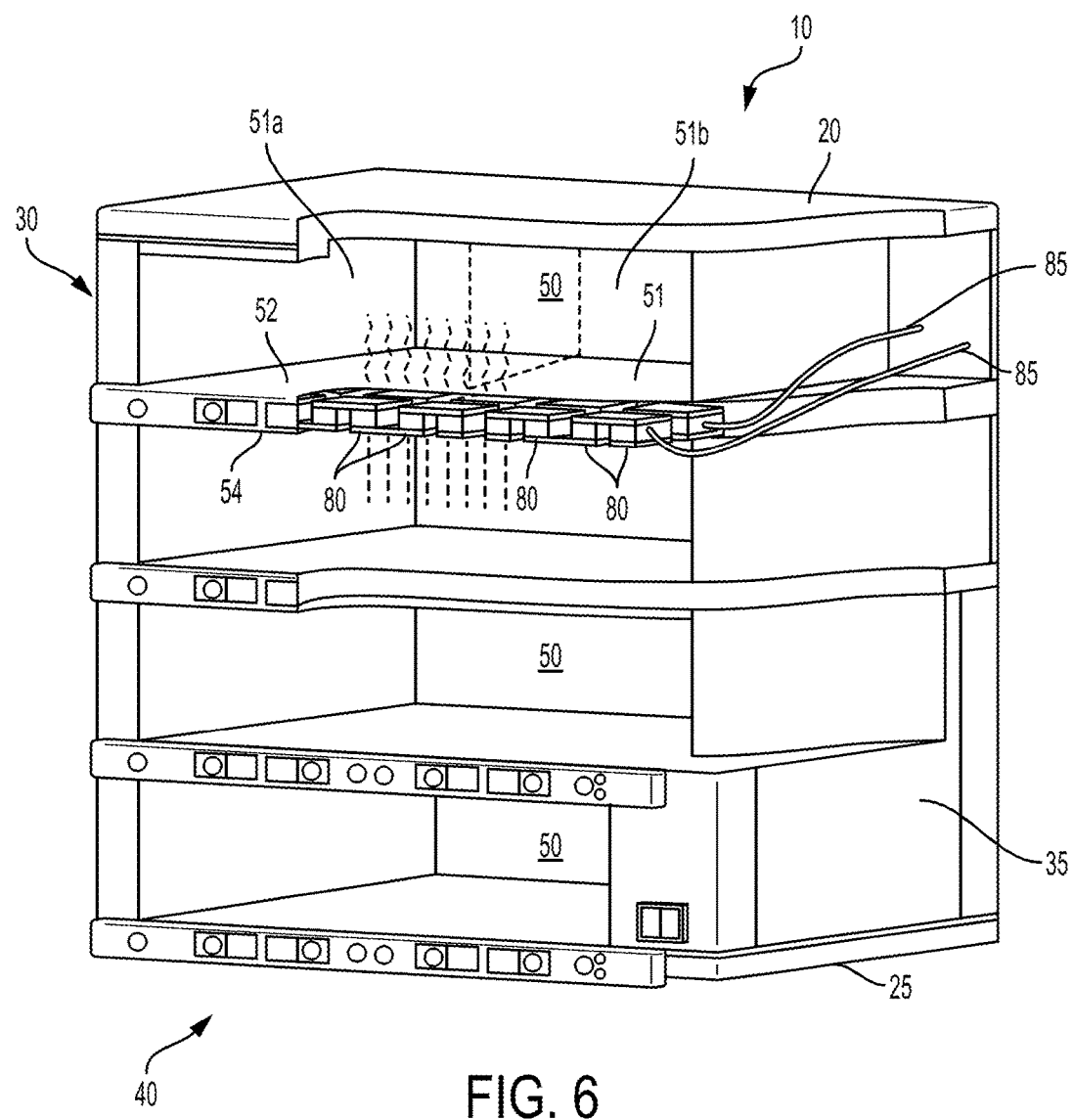
FIG. 6 is a partially cutaway top perspective view of yet another alternate embodiment of a multi-zone food holding bin.

An alternate embodiment, as illustrated in FIG. 6, may use the thermoelectric effect provided by one or more Peltier devices 80 to heat one or more of the compartments 50.

The thermoelectric effect is a direct conversion of a temperature difference into an electric voltage and vice versa. When a voltage is applied to a thermoelectric device, a temperature difference is created across the two sides of the device. The temperature difference created in response to an applied voltage is known as the Peltier effect. Devices that produce temperature differences in response to an applied voltage are considered herein to be Peltier devices. A Peltier device 80 is therefore considered herein to be a heat source or heating element.

Peltier devices have a "cold" side and a "hot" side. The cold side absorbs heat whereas the hot side emits heat. Heat emitted from the hot side includes at least some of the heat absorbed from the cold side. A Peltier device 80 is therefore considered herein to be a solid-state heat pump or heat-sinking device.

FIG. 6 is a cutaway view of another embodiment of a point-of-use holding cabinet using Peltier devices to heat the food holding compartments 50. In one embodiment, one or more Peltier devices 80 are "sandwiched" between, and in thermal communication with the bottom planar surface 53 and the upper planar surface 54 described above. Electrical energy is provided to the Peltier devices 80 through wires 85, under the control of a controller.

"Sandwiching" the Peltier devices in a shelf 52 as shown in FIG. 6 provides a shelf 52 cold on one side and hot on the other. Such a shelf 52 structure thus enables a dual-mode food holding cabinet 10 having a "first" food holding compartment 50 that is warm and a vertically adjacent "second" food holding compartment 50 that is cold.

Temperature control of a thermoelectric, Peltier device 80 may be accomplished by controlling the electric energy provided to the device. Temperature control of one side of the Peltier device 80 can also be effectuated by controlling heat transferred into or out of the opposite side of the device, as described in US 2010-0307168 A1, entitled "Thermo Electric Cooler," the disclosure of which is incorporated herein by reference in its entirety.

In another embodiment of a multi-zone food holding bin 10, multiple Peltier devices 80 are mounted between the bottom surface 53 and the upper surface 54 but have only their hot sides thermally coupled to the bottom surface 53 and to the upper surface 54. Air is then moved through the inter-plate space to heat the cool sides of the Peltier devices therein.

Peltier devices as disclosed herein and similar heat transfer devices are thermally coupled to the shelf 52, preferably by way of mechanical attachment to at least one of the plates that form the lower planar surface 53 and the upper planar surface 54. Mechanical attachment and the resultant thermal coupling is preferably accomplished by a thermally-conductive adhesive, however, clamps that are attached to a plate by screws driven into a plate can also be used.

The shelves are mechanically coupled to the side panels 30 and 35. The side panels are also preferably made from thermally-conductive material such as aluminum. Thermally coupling a heat transfer device to one or more plates that comprise a shelf therefore also thermally couples the heat transfer device to the side walls and thus to the compartment. Heat transfer devices coupled to a shelf are therefore also thermally coupled to the corresponding compartment.

While the temperature of a Peltier device can be controlled by controlling the heat dissipated from the hot side and/or the heat absorbed into the cold side, cabinet embodiments disclosed herein preferably control compartment temperature using one or more semiconductor temperature sensors, thermally coupled to one or more of the thermally-conductive structures that comprise a compartment. Cabinet embodiments disclosed herein preferably use a semiconductor temperature sensor that is directly coupled and therefore thermally coupled to the heated surfaces 53 and/or 54 provided by the shelves 52.

Semiconductor temperature sensors used in preferred embodiments disclosed herein are disclosed in U.S. Pat. No. 8,247,745, which is entitled "Temperature Sensor for a Food Holding Cabinet" the entirety of which is hereby incorporated by reference herein, especially the teachings of the structure and use of a semiconductor temperature sensor.

Thus, suitable heating elements for use in accordance with the disclosure include electrically-resistive heating elements, such as heated coils, radiant heating elements that provide heat energy via radiation, and devices and ancillary equipment that provide heat to a working fluid. As described above, Peltier devices may also be used as heating elements in accordance with the disclosure.

The foregoing description is for purposes of illustration only and not for purposes of limitation. The true scope of the invention is set forth by the appended claims.

What is claimed is:

1. A multi-zone food holding bin comprising:
a chassis having a top panel, a first side panel, a second side panel, a bottom panel, a front face, and an opposing rear face;
a first food holding compartment within the chassis, the first food holding compartment being defined by the first side panel, the second side panel, the top panel and a shelf, the top panel including at least one downwardly depending lid holding shelf, the first food holding compartment being substantially unobstructed between the first side panel and the second side panel and below the downwardly depending lid holding shelf;
a second food holding compartment disposed below the first food holding compartment within the chassis, the second food holding compartment being defined by the first side panel, the second side panel, the bottom panel and the shelf, the shelf including at least one downwardly depending lid holding shelf, the second food holding compartment being substantially unobstructed between the first side panel and the second side panel and below the downwardly depending lid holding shelf;
wherein the shelf is located between the first and second food holding compartments and comprises a first side and a second side, the first side facing into the first food holding compartment, the second side facing into the second food holding compartment, the first side defining a first substantially planar surface comprising a thermally conductive material forming a top surface of the shelf and forming a bottom surface of the first food holding compartment, the first substantially planar surface adapted to receive a tray for food items;
and wherein the bottom panel includes a second substantially planar surface comprising a thermally conductive material forming a bottom surface of the second food holding compartment, the second substantially planar surface adapted to receive a tray for food items;
a first opening in the front face of the chassis defined by the first substantially planar surface, the first side panel, the second side panel and the top panel, the first opening configured to allow the tray for food items to be passed through the first opening and onto the first substantially planar surface;
a second opening in the front face of the chassis defined by the second substantially planar surface, the first side panel, the second side panel and the shelf, the second opening configured to allow the tray for food items to be passed through the second opening and onto the second substantially planar surface;
a third opening in the rear face of the chassis defined by the first substantially planar surface, the first side panel, the second side panel and the top panel, the third opening configured to allow the tray for food items to be passed through the third opening from the first substantially planar surface;
a fourth opening in the rear face of the chassis defined by the second substantially planar surface, the first side panel, the second side panel and the shelf, the fourth opening configured to allow the tray for food items to be passed through the fourth opening from the second substantially planar surface;
a first food holding zone formed in the first food holding compartment, the first food holding zone having at least one independently controllable heating element disposed at a top portion of the first food holding compartment, and at least one independently controllable heating element disposed at a bottom portion of the first food holding compartment, the first food holding zone having a controllable first food holding temperature;
a second food holding zone formed in the first food holding compartment, the second food holding zone having at least one independently controllable heating element disposed at the top portion of the first food holding compartment and at least one independently controllable heating element disposed at the bottom portion of the first food holding compartment, the second food holding zone having a controllable second food holding temperature;

a third food holding zone formed in the second food holding compartment, the third food holding zone having at least one independently controllable heating element disposed at a top portion of the second food holding compartment, and at least one independently controllable heating element disposed at a bottom portion of the third food holding compartment, the third food holding zone having a controllable third food holding temperature;

a fourth food holding zone formed in the second food holding compartment, the fourth food holding zone having at least one independently controllable heating element disposed at the top portion of the second food holding compartment and at least one independently controllable heating element disposed at the bottom portion of the second food holding compartment, the fourth food holding zone having a controllable fourth food holding temperature;

at least one user interface for controlling the food holding temperature of each food holding zone; and a controller operatively coupled to the user interface and each heating element, the controller configured to independently operate each heating element such that each food holding zone has an independently controlled food holding temperature.

2. The food holding bin of claim 1 wherein each interface is a graphical interface that displays the food holding temperature of each food holding zone.

3. The food holding bin of claim 1, further comprising a first bezel attached to the chassis, the first bezel providing at least one user interface comprising dedicated controls and/or dedicated displays for each of the first, second, third, and fourth food holding zones.

4. The food holding bin of claim 3, wherein the first bezel is set forward from the shelf and defining a space between the first bezel and the front face.

5. The food holding bin of claim 4, further comprising a latch moveable from a locked position to an unlocked position within the space between the first bezel and the front face.

6. The food holding bin of claim 3, wherein the first bezel provides at least one graphical interface comprising at least one dedicated display and the dedicated display displays a temperature setting for a corresponding food holding zone.

7. The food holding bin of claim 3, wherein the dedicated display displays additional information about a food item stored in the corresponding food holding zone.

8. The food holding bin of claim 6, wherein the dedicated display displays additional information about a food item stored in the corresponding food holding zone.

9. The food holding bin of claim 3, wherein the first bezel provides two user interfaces arranged horizontally beneath the first food holding zone and the second food holding zone, respectively.

10. The food holding bin of claim 3, wherein the first bezel is located proximate the front face of the chassis, the food holding bin further comprising a second bezel located proximate the opposing rear face of the chassis.

11. The food holding bin of claim 1, further comprising a latch disposed adjacent the first opening.

12. The food holding bin of claim 11, wherein the latch is located between the first food holding bay and the second food holding bay.

13. The food holding bin of claim 11, wherein the latch is rotatable or translatable from a first position to a second position.

14. The food holding bin of claim 1, further comprising at least one food holding tray resting on at least one substantially planar surface within one food holding zone.

15. The food holding bin of claim 14, wherein the independently controllable heating elements disposed at the bottom portion of the first and second food holding compartments provide heat energy to at least one food holding tray through conduction.

16. The food holding bin of claim 14, wherein the independently controllable heating elements disposed at the top portion of the first and second food holding compartments provide radiant heat to at least one food holding tray.

17. The food holding bin of claim 14, wherein the independently controllable heating elements disposed at the top portion of the first and second food holding compartments provide radiant heat energy to at least one food holding tray and the independently controllable heating elements disposed at the bottom portion of the first and second food holding compartments provide heat energy through conduction to at least one holding tray.

18. The food holding bin of claim 1, wherein the independently controllable heating elements comprise a resistive wire.

19. The food holding bin of claim 1, wherein at least one of the substantially planar surfaces is a continuous surface.

20. The food holding bin of claim 1, wherein at least one of the substantially planar surfaces is substantially free of any dividing walls or other structure between the first, second, third, and fourth food holding zones.

21. The food holding bin of claim 14, wherein each food holding zone further comprises a lid holding shelf elevated above the substantially planar bottom surface in the first food holding compartment and the second food holding compartment, each lid holding shelf being configured to receive and store a lid for the food holding tray.

22. The food holding bin of claim 21, wherein a latch is disposed adjacent the first opening and is moveable between a locked position in which the latch prevents a lid from being removed from the lid holding shelf, and an unlocked position in which the latch allows removal of a lid from the lid holding shelf.

23. The food holding bin of claim 22, wherein the latch is rotatable and is biased into the locked position by gravity.

24. The food holding bin of claim 21, wherein the lid holding shelf comprises sheet metal.

25. The food holding bin of claim 21, wherein the lid holding shelf comprises a wire form.

26. The food holding bin of claim 1, wherein each independently controllable heating element disposed at the top portion of the first and second food holding compartments is adapted to output more heat energy than the independently controllable heating elements disposed at the bottom portion of the first and second food holding compartments.

27. The food holding bin of claim 1, wherein at least one substantially planar surface comprises aluminum.

28. The food holding bin of claim 1, wherein the first food holding zone and the second food holding zone are heated to different temperatures.

29. The food holding bin of claim 1, wherein each of the food holding zones are each heated to different temperatures.

30. The food holding bin of claim 1, wherein the shelf comprises an upper thermally conductive plate disposed in the shelf and in thermal communication with the first side, a lower thermally conductive plate disposed in the shelf and in thermal communication with the second side, a first set of independently controllable heating elements in thermal communication with the upper thermally conductive plate, and a second set of independently controllable heating elements in thermal communication with the lower thermally conductive plate;

wherein the first set of independently controllable heating elements are capable of providing different amounts of heat energy into the first and second food holding zones of the first food holding compartment; and wherein the second set of independently controllable heating elements are capable of providing different amounts of heat energy into the third and fourth food holding zones of the second food holding compartment.

31. The food holding bin of claim 30, wherein an insulating material is provided between the first and second sets of independently controllable heating elements.

32. The food holding bin of claim 30, wherein each of the first and second sets of independently controllable heating elements comprise two heating elements.

33. The holding bin of claim 1, wherein the at least one user interface is configured to set the food holding temperature of each food holding zone, and the first food holding zone is maintained at first set food holding temperature, the second food holding zone is maintained at a second set food holding temperature, the third food holding zone is maintained at a third set food holding temperature, and the fourth food holding zone is maintained at a fourth food set holding temperature.

34. The holding bin of claim 1, wherein the at least one user interface is configured to set the food holding temperature of each food holding zone and the controller independently operates each heating element such that each food holding zone is maintained at an independently set food holding temperature.

\* \* \* \* \*

UNITED STATES PATENT AND TRADEMARK OFFICE
CERTIFICATE OF CORRECTION

Page 1 of 1

PATENT NO. : 10,492,641 B2
APPLICATION NO. : 15/985255
DATED : December 3, 2019
INVENTOR(S) : Kyle Thomas Kestner et al.

It is certified that error appears in the above-identified patent and that said Letters Patent is hereby corrected as shown below:

In the Claims

In Claim 1, Column 11, Lines 1-7, should read: "a third food holding zone formed in the second food holding compartment, the third food holding zone having at least one independently controllable heating element disposed at a top portion of the second food holding compartment, and at least one independently controllable heating element disposed at a bottom portion of the second food holding compartment..."

Signed and Sealed this
Twelfth Day of May, 2020

Andrei Iancu
*Director of the United States Patent and Trademark Office*